United States Patent [19]
Olashuk et al.

[11] Patent Number: 5,776,258
[45] Date of Patent: Jul. 7, 1998

[54] FLAT-ROLLED STEEL STRIP CONTINUOUS CLEANSING METHODS

[75] Inventors: Kenneth R. Olashuk, Follansbee; Lester R. Shields, Weirton, both of W. Va.

[73] Assignee: Weirton Steel Corporation, Weirton, W. Va.

[21] Appl. No.: 753,267

[22] Filed: Nov. 22, 1996

Related U.S. Application Data

[62] Division of Ser. No. 445,530, May 23, 1995, Pat. No. 5,599,395.

[51] Int. Cl.$^6$ ............................................. B08B 1/02
[52] U.S. Cl. ............... 134/15; 134/10; 134/64 R; 134/109; 266/102; 266/111; 266/112; 118/67; 118/68; 118/405; 118/419; 118/610; 118/623
[58] Field of Search .................. 118/58, 67, 68, 118/405, 419, 610, 623, 683; 134/64 R, 109, 10, 15; 266/102, 111–113

[56] References Cited

U.S. PATENT DOCUMENTS

| | | | |
|---|---|---|---|
| 3,871,982 | 3/1975 | Idstein | 204/207 |
| 4,119,109 | 10/1978 | Lukac et al. | 134/64 R |
| 4,521,455 | 6/1985 | Domokos | 427/178 |
| 4,784,169 | 11/1988 | Striedieck | 134/111 |
| 5,116,447 | 5/1992 | Kimura et al. | 156/345 |
| 5,179,967 | 1/1993 | Mattiussi | 134/60 |

*Primary Examiner*—Harold Y. Pyon
*Attorney, Agent, or Firm*—Shanley and Baker

[57] ABSTRACT

In-line flat-rolled steel cleansing and finishing methods and apparatus are disclosed which enable flat-rolled steel, as supplied with surface areas contaminated with iron fines and other debris from gauge reduction operations, to be continuously processed in-line, free of interruptions for cleansing purposes. Continuous-strip methods and apparatus are disclosed which enable in-line continuous-strip cleansing in a manner which decreases iron fines carried by strip surfaces to a desired level while providing for continuous uniform cleansing. Carry-over of iron fines from the cleansing operations so decreases such that iron content of a coating means is decreased resulting in improved corrosion-protection coating. Diminishing iron content in a hot-dip galvanizing bath increases efficiency of aluminum additions and diminishes iron-aluminum dross.

5 Claims, 6 Drawing Sheets

FLAT-ROLLED STEEL STRIP CONTINUOUS CLEANSING METHODS

This application is a division of application Ser. No. 08/445,530, filed May 23, 1995, now U.S. Pat. No. 5,599,395.

INTRODUCTION

This invention relates to continuous flat-rolled steel strip finishing operations and, more specifically, is concerned with improving corrosion-protective adhesion of finish coatings by improving continuous-surface cleansing methods and apparatus for flat-rolled steel as supplied for finish coating operations.

Flat-rolled steel as provided for corrosion-prevention finishing includes surface contaminants from hot rolling and/or cold rolling gauge reduction operations. Large capacity cleaning solution can be built into flat-rolled steel strip processing lines in an attempt to extend the time period during which a cleaning solution can be used without interrupting line operations to replace the cleaning solution. However, increased tank capacities increase down time in order to allow for removal of large volumes of spent solution and replacement with new chemically controlled cleaning solution. So-called continuous-strip finishing line operations cannot be "continuous" when it is necessary to stop finishing line operations for removal and replacement of cleaning solution.

SUMMARY OF THE INVENTION

It has been found that changing levels of iron fines in cleaning solutions has detrimental effects on cleansing operations and finish coating operations.

It is an object of the present invention to enable continuous flat-rolled steel strip finishing operations without interruption due to surface cleansing operations.

Objectives of the invention are to increase uniformity of continuous-strip cleansing operations and of finishing operations, and to diminish waste disposal requirements.

Other advantages and contributions of the invention are set forth more specifically with references to the accompanying drawings.

DETAILED DESCRIPTION OF THE INVENTION

Flat-rolled steel, as provided after hot rolling and cold rolling gauge reductions, presents surface contaminants including iron fines and combinations of differing forms of iron oxide. In certain operations, hot rolling mill scale may not be adequately removed before cold rolling and, in addition, the level of iron fines increases during cold rolling gauge reductions. Surface contaminants can also include semi-solid agglomerates when cold rolling lubricants are used, for example in temper rolling operations.

It has been found that iron fines continue to accumulate in large-capacity cleansing tanks notwithstanding continuous mechanical filtering. Other significant operational and finish coating factors are also involved. It has been found that significantly changing and increasing levels of iron fines in cleaning solution are detrimental to uniform strip cleansing and are also detrimental to in-line finish coating. For example, increasing levels of iron fines in an in-line cleaning solution increases the iron fines carried by the strip into an in-line hot-dip galvanizing bath, and the resulting increase in iron content in the galvanizing bath decreases the effectiveness of aluminum additions to the bath.

It has been found that sustained separation of flat-rolled steel surface-area contaminants improves in-line cleansing and improves finishing operations. Finishing operations for flat-rolled steel encompass such operations as hot-dip coating with zinc, zinc alloys, terne metal and the like, metallic electroplating with tin, zinc, nickel-zinc, chrome and chrome oxide, and temporary corrosion prevention coatings, and/or coating with a polymeric material in a solvent, electrolytically, or in a solid laminate or powder form.

Figure 1:
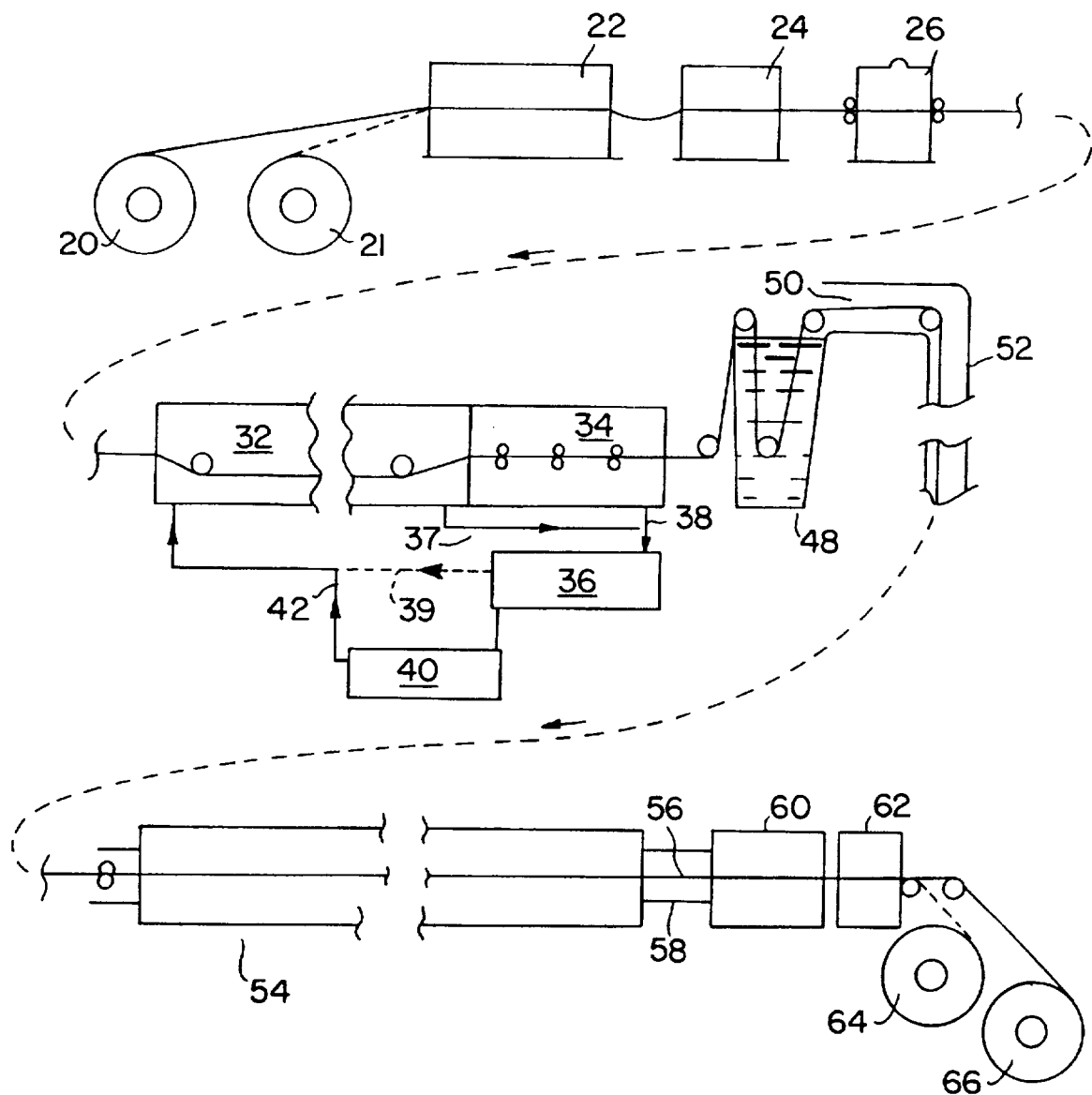
FIG. 1 is a schematic general arrangement for describing continuous flat-rolled steel strip finishing line operations embodying the invention.

Referring to the finishing line embodiment of FIG. 1, flat-rolled steel strip of coils 20, 21 has been produced from cast ingots or slabs by hot processing including hot rolling, during which mill scale and other contaminating debris build up on surface areas. Cold rolling follows, often without sufficient removal of hot rolling mill scale and, further, cold rolling increases iron fines on cold rolled surface areas. Also, when the strip is temper rolled, a rolling lubricant is added such that contaminated strip surface areas can include semi-solid agglomerates.

Leading and trailing edges of the strip are trimmed at 22 (FIG. 1) in preparation for feeding by pinch rolls 24 to welder 26. Use of a looping pit or tower helps in providing continuous-length flat-rolled steel strip for processing free of interruption due to discontinuity in the length of the strip.

In continuous strip galvanizing operations, finishing line operations have had to be interrupted due to strip cleansing operations. Continuous mechanical filtering of large-capacity cleaning solution tanks did not stop the increase in iron fines in such tanks. Iron fines accumulated in such tanks to about five hundred ppm over about a two-week operating period of a continuous strip galvanizing line. And non-uniformity in the continuous steel strip cleansing operation accompanied the increasing buildup of iron fines. Increasing the level of iron fines in a large-capacity tank quantitatively increases iron fines carried by the strip and, thereby, increase iron content of the in-line hot-dip galvanizing bath.

The time loss during interruption of operations, and disposing of large quantities of cleaning solution present serious economic problems. However, the detriment to uniformity of cleansing, non-uniform coating adhesion, and the detriment to roll surfaces used in in-line heat treatment or annealing furnaces for continuous strip present additional problems.

The present teachings, by decreasing the iron fines carried with the strip, facilitate significant decrease in iron content of a hot-dip galvanizing spelter bath, providing increased aluminum efficiency and other advantages.

The present invention (a) provides for increasing uniformity of an in-line strip cleansing operation, (b) eliminates problems of disposal of large volumes of cleaning solution from such large-capacity tanks after relatively short operational periods, (c) eliminates non-uniformity of strip surfaces and finishing operations resulting from the buildup of iron fines in such large tank capacities, (d) diminishes wear on furnace rolls, and (e) significantly decreases the quantity of spent cleaning solution for disposal.

In the embodiment shown schematically in FIG. 1, a main tank 32 provides sufficient hot caustic cleaning solution, and sufficient strip travel distance for dislodging surface contaminants on flat-rolled steel as supplied for a hot-dip galvanizing line. Electrolytic cleaning, or other solutions, can be used in a tank such as 32. In addition, a scrubber shown at 34, can be used in certain finishing line embodiments.

An objective of the invention is to continuously maintain cleaning solution in a main cleansing tank at a desired purity level for iron fines so as to enable maintaining desired uniformity of continuous-cleansing operations; and, also, to eliminate periodic interruption of finishing operations to rapidly dispose of solution from a main cleansing tank, such as 32, and/or from a scrubber 34, if used.

Continuous control of circulation of cleaning solution is preferred. A preselected portion of the cleaning solution from a main cleaning tank is continuously removed; and, a feedback loop is provided for continuous return of cleaning solution after comprehensive and controlled (a) separation, (b) removal, and (c) retention of surface contaminants out of the feedback path.

Continuous mechanical filtering of solid and semi-solid contaminants is preferred. As taught herein, that step is advantageously used to facilitate the desired control of solution withdrawal and feedback. However, special separation means are provided for controlled separation, removal and retention of iron fines and associated debris from the strip cleansing and finishing operations. Configurational features of a special tank which consistently separates, removes, and retains solid and semi-solid contaminants are described in more detail later in relation to FIGS. 2–6.

In the embodiment of FIG. 1, receptor means 36 initiates controlled withdrawal of cleaning solution, with iron fines and associated debris, from a preselected location or locations of cleaning tank 32 and/or scrubber 34. Conduits 37, 38 from such main cleaning tank operation are directed to receptor means 36 in which movement can be implemented by a pumping system. Mechanical filtering means can be included as part of receptor means 36. When mechanical filtering is used, conduit 39 (shown in interrupted lines) returns the filtrate to tank 32 after mechanically filtering contaminating solids and semi-solids.

Then a special separation, removal, and retention structure (described in detail in relation to FIGS. 3–6) functions to keep in-line cleansing and finishing systems free of separated contaminants. Such controlled separation, removal and retention can be operated to eliminate mechanical filtering; but, preferably, is used in combination to provide desired augmentation. Feedback line 42 from separating structure 40 completes a solution path from receptor 36, through structure 40, and return to main tank 32.

The contaminant separation, removal, and retention teachings of the invention enable a continuously-operable cleansing system which eliminates any need for periodic change of large volumes of contaminated cleaning solution from a tank such as 32.

In the continuous-strip finishing operations of FIG. 1, a cleaning solution rinse location 48 can be used, and enclosure of strip 50, as indicated at 52, can be provided to minimize surface oxidation while strip 50 is being directed to furnace means 54. The atmosphere of heat treatment furnace 54 is controlled to prevent oxidation of strip surface areas; preferably, furnace 54 is provided with a chemically reducing atmosphere, such as nitrogen and hydrogen.

Strip travel in heat treatment furnace 54 can also be stacked in horizontal layers, or looped vertically in a tower, to provide an extended length steel substrate treatment path of, for example, from several hundred to six hundred feet, or more. The strip is guided and supported by rolls in such furnaces, and treatment temperatures are preselected from about 650° F. to a strip steel annealing temperature which can be above 1,250° F.

From furnace 54, heat treated strip 56 is directed through an atmosphere-controlled chute 58 into a finish-coating operation, schematically represented at 60, which can be selected from a variety of finishing and coating methods. After finishing, various steps, such as leveling the strip or cutting into sheets, which are schematically represented by station 62, can be carried out. In the specific embodiment of FIG. 1, the continuous strip is processed into coils 64, 66 of extended length.

The continuous steel strip cleansing system of the invention includes a special separation means 70 (FIG. 2) for separation, removal, and retention of the iron fines and associated debris. In the flat-rolled steel continuous-strip cleansing embodiment of FIG. 2, contaminated surface areas of strip 72 are treated, generally by at least partial submersion, in a main tank 73 having sufficient capacity to provide desired travel through a hot caustic solution; a scrubber 74 can also be used. Cleaning solution with accompanying contaminants is preferably withdrawn continuously from a preselected location, or locations, and directed through a conduit, such as 75 or 76. Monitoring of iron fines in the main tank is schematically indicated at 77. A continuously-operable mechanical filtering structure 78 is preferably selected to provide for withdrawal of a portion of the capacity of main tank 73 at a controlled rate. Filtrate, from which iron fines and associated debris have been mechanically filtered, is continuously returned from mechanical filtering structure 78 through conduit 80 to main tank 73.

It has been found that continuous mechanical filtering does not stop the buildup of iron fines in large-capacity cleaning solution tanks, such as 73, 74, used in continuous steel strip galvanizing lines.

Purged solid and semi-solid contaminants from mechanical filtering structure 78 are flushed, preferably continuously. Such flushed purge is directed through conduit 82 to separation means which includes tank 70 for continuous separation and retention of solid and semi-solid contaminants. Separation tank 70 is operated to retain such contaminants in a controlled manner so as to diminish iron fines in the solution of main tank 73 and/or so as to maintain a selected and controlled purity level for iron fines in such main tank.

To carry out such functions, tank 70 is fabricated from non-ferromagnetic material which is identified and referred to as paramagnetic. The configurational aspects of separating tank 70 (FIG. 3) and the paramagnetic material make important contributions. Specifically, the paramagnetic material has no effect on magnetic lines of flux. Structural framework can be used for bracing bottom and corner borders of a separating tank, such as 70, provided positioning of the framework is selected so as to be without significant influence on the magnetic lines of flux which act within separating tank 70 as part of the invention.

The paramagnetic material and novel configuration of separating tank 70 (FIGS. 3–6) are selected to provide for extended-area surface treatment of the purge, flushed from mechanical filtering structure, which is carrying iron fines, iron oxides, and/or semi-solid agglomerates. Such iron fines and associated debris are controllably separated and retained in separating tank 70. With such separation and retention, the cleansed solution of separating tank 70 is returned to main cleaning solution tank 73. Improved continuous-strip finishing line operations are provided, and continuous in-line operations need not be interrupted due to strip surface cleansing functions.

A level of iron fines, as selected for main tank 73 (shown and described in relation to FIG. 7), is continuously controlled to a desired low level by the continuously-operable cleansing system and methods taught. And such teachings facilitate decrease in the iron content of an in-line galvanizing bath. The iron content of an in-line hot-dip galvanizing bath for the embodiment of FIG. 1 is controllably decreased, as shown and described in more detail in relation to FIG. 8.

Figure 3:
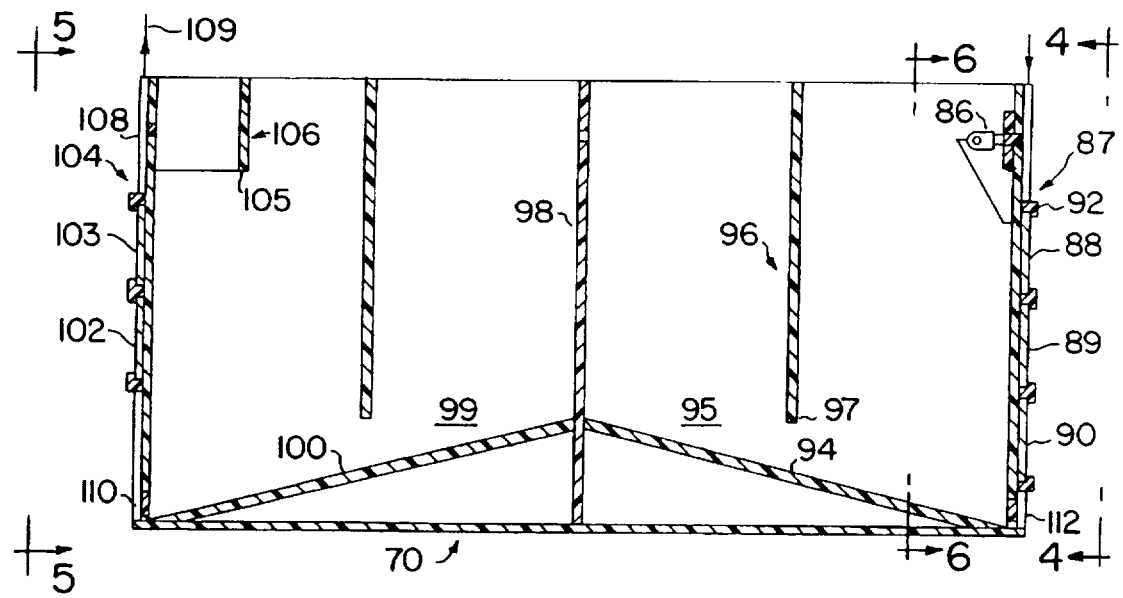
FIG. 3 is a schematic cross-sectional view for describing functions of a particulate separation and retention tank for use in the apparatus of FIG. 2.

Referring to the cross-sectional view of contaminant separating tank 70 of FIG. 3, side walls, endwalls, weirs, a dam site, a froth protector circumscribing the tank outlet, and the canted bottom panels are all formed from a paramagnetic material, such as polypropylene. An optimum capacity for tank 70 is preselected. A volume of about five hundred gallons has been selected for use in a specific embodiment with a five-thousand gallon main tank 73 for a continuous steel strip hot-dip galvanizing line which has an average throughput of steel in the range of about two million square feet of surface area per side per day.

Figure 6:
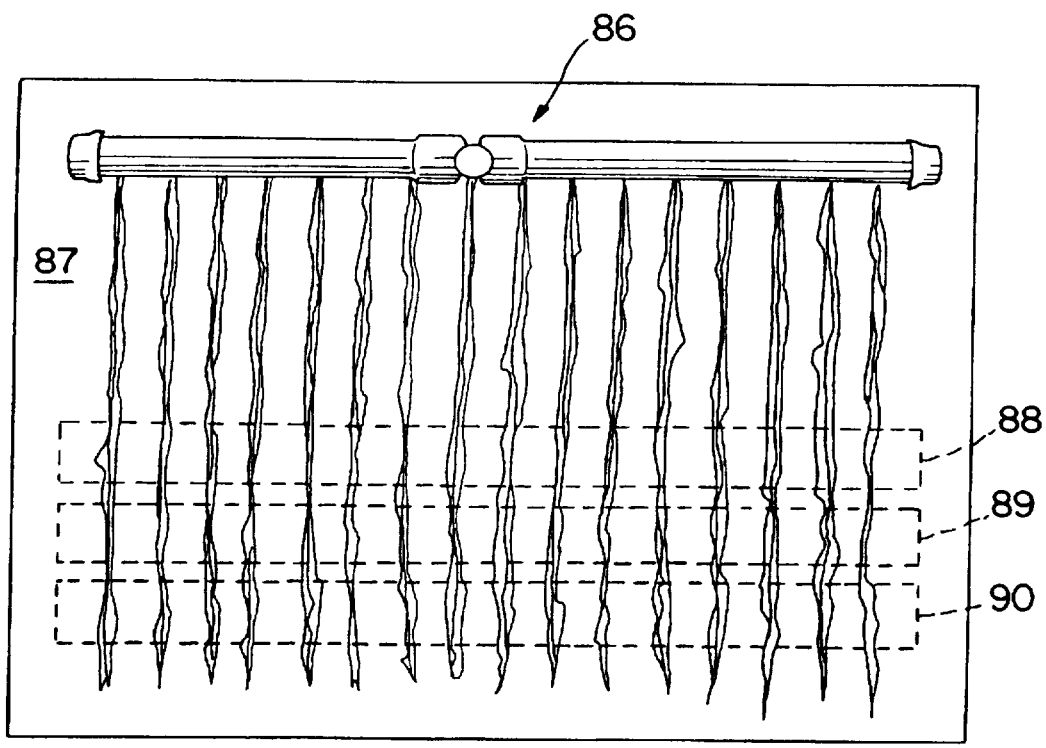
FIG. 6 is a schematic elevational view taken along the line 6—6 of FIG. 3 for describing contaminated solution distribution internally of the separating tank in the area described in relation to FIG. 4.

The purged iron fines and associated debris from mechanical filtration structure 78 are continuously flushed (FIG. 2) and introduced at inlet means of separation tank 70 (FIG. 3) and distributed by conduit 86. Distribution across an inner surface width of endwall panel 87 is best seen in FIG. 6. The cleaning solution flushed purge, with iron fines and associated debris, is directed and controlled in tank 70 to bring about separation and retention of iron fines and such debris.

Magnetic field source means are mounted to be out of direct contact with a caustic cleaning solution.

Figure 4:
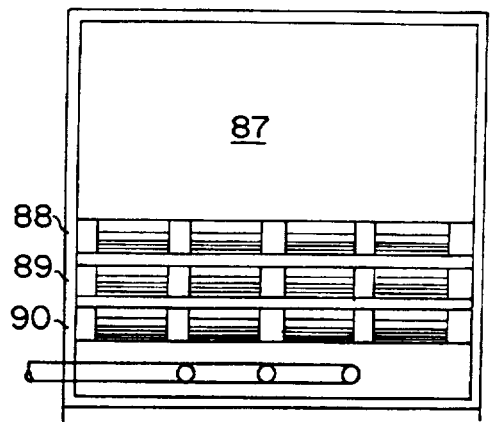
FIG. 4 is a schematic elevational view taken along the line 4—4 of FIG. 3 for describing functioning as contaminated solution enters the separating tank embodiment of FIG. 3.

Preferably, magnetic field source means are mounted at the inlet end 84 of tank 70 on the external surface of endwall 87. Magnetic field sources are mounted in horizontal rows such as 88, 89, 90 (FIGS. 3, 4). A plurality of magnets can be mounted in each row (FIGS. 3–5) across the width of tank 70; or a single magnet extending across the width of the tank can be used in each row (as indicated by FIG. 6). While permanent magnets are preferred, provisions can be made for use of electromagnets. The establishment and positioning of the magnetic field sources, as well as the magnetic force level, are selected. As best seen in FIGS. 3–4, the magnets have been positioned to function from an external surface of endwall 87; magnet holding structure 92 is paramagnetic in order to avoid diminishing the influence of the magnetic field.

The magnetic field extends through the paramagnetic material endwall 87 and is exerted on the interior of the tank 70. Lines of flux are established in substantially parallel relationship to the internal planar surface of endwall 87 across its width, and are established along its height, in the specific embodiment, by preselection of the number of magnet rows. The lines of flux are not affected by the endwall material which is approximately one-inch thick polypropylene. Incoming mechanically-filtered flushed purge, contaminated with iron fines and associated debris, is distributed, as shown in FIG. 6, over an extended surface area while being subjected to lines of magnetic force over such extended surface area. The contaminants in the flushed purge consist essentially of ferromagnetic material, such as iron fines and various iron oxides; other contaminants become associated or agglomerated, for example, by the rolling oils which are not ferromagnetic. Such contaminants are urged by the magnetic field toward an interior surface, for example, endwall 87 where the magnetic sources are mounted. Some contaminants are held directly against that endwall and some are held in suspension in accumulating solution, as described later. Some descend under the influence of gravity toward an area defined between endwall 87 and canted floor panel 94 (FIG. 3) for drainage from tank 70.

Iron fines and associated debris are attracted and held in tank 70. While most purged solids are ferromagnetic, other semi-solid contaminants which are in some way associated with, or agglomerated with, ferromagnetic material are also drawn toward wall 87 and/or toward other surfaces so as to be separated and held in tank 70.

As the liquid rises in space 95 (on the solution entry side of tank 70), solids are also partially retained by the location of weir 96. Accumulating liquid must pass under the lower distal end 97 of weir 96 in order to fill the space 95, established in part by dam 98 and located on the entrance side of the embodiment of tank 70 shown. The ferromagnetic contaminants, which are suspended and held in accumulating liquid in tank 70, appear to attract and hold similar contaminants from the incoming solution. An increase in the magnetic field strength can be selected to increase the extent of magnetic field influence within the tank.

During the time that solution is gathering on the incoming side (space 95), make-up solution can be added to space 99 on the return side of dam 98 if the distribution and/or balance of solution weight, or the forces due to such weight, are required due to the use of paramagnetic materials to form a unitary tank structure (70). In practice, the bracing effect of canted panels 94, 100, and the use of two-inch thick side walls, can provide adequate strengthening of a tank, fabricated to be unitary, from paramagnetic panels using heated plastic welding material which is compatible with the panel material and which is also paramagnetic.

Figure 5:
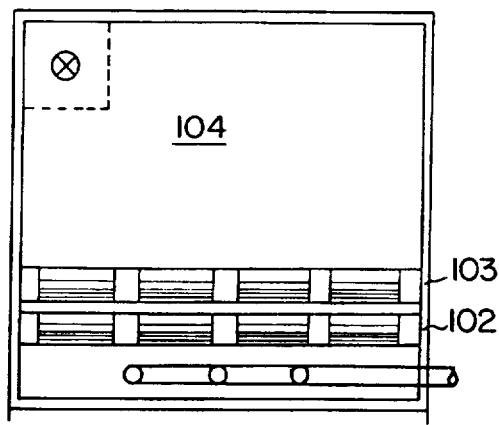
FIG. 5 is a schematic elevational view taken along the line 5—5 of FIG. 3 for describing functioning prior to and upon return of cleansed solution from the separating tank embodiment of FIG. 3.

Incoming flushed purge travels over the interior surface of wall 87 with contaminants being attracted by the magnetic field. Then, solution moves along canted floor 94 under distal end 97 of weir 96 while filling space 95. After passing through openings in dam 98 (or over a dam site if a decreased height dam is used), the liquid directed along canted floor panel 100 is brought under the influence of other magnetic field sources, such as those shown in rows 102 and 103 along return endwall 104 (FIGS. 3 and 5). Remaining contaminants in the liquid (if any), after the earlier separation, settling, and suspension processes, are brought under the influence of magnetic lines of force of the magnetic fields established by the magnets of rows 102, 103.

As cleaning solution level rises in space 99 above the lower distal end 105 of froth detainer 106 (which circumscribes return outlet 108) the return liquid, from which contaminants have been separated and retained, is directed, substantially free of froth, toward main tank 73. Return pumping can be provided, as indicated at 109, for return to main tank 73. Placement of tank 70 in relation to main tank 73 can enable return by gravity; either supply to, or the return from, tank 70 can be augmented by pump means where the physical layout of the line area requires.

The configurational features of separating tank 70, as depicted and described in relation to FIGS. 3–6, provide extended-surface areas for exposure to the magnetic field sources, help to direct solution movement in order to help control separation and retention of iron fines and associated debris, and provide for ease of removal of retained contaminants. The latter, for example, by drainage of compartments 95,99, simultaneously or separately. Cleaning of separated iron fines from tank 70 is facilitated by configurational and operational aspects of separating tank 70. It is to be understood that the number of weirs, dam sites, floor panels, number of magnets, and number of locations for magnets can be increased, along with increases in strength of magnetic fields, to extend the magnetic field influence in relation to the solution movement pattern within separating tank 70.

It has been found that contaminants, as attracted by the lines of magnetic force of the magnets, tend to be suspended in and held in the accumulating liquid. Such suspended contaminants extend a substantial distance toward the center of the tank, which is indicative of the strength of the magnetic field.

Drainage valves 110, 113 (FIG. 3) are positioned so that clearing solution from a compartment of tank 70 by draining also readily clears suspended contaminants. Each compartment can be cleared by vacuum suction or drainage methods, or combinations thereof. When a compartment is drained, contaminants fall under the influence of gravity, as the liquid moves toward the drainage area defined by each endwall and its respective canted floor panel (94, 100). Without intending to be bound, it appears that the lines of magnetic force may be concentrated by the attracted ferromagnetic contaminants, as suspended, and that the latter may help to attract additional contaminants.

Continuous liquid suction clearing of an internal wall can be utilized, or timed intervals can be selected for clearing of individual compartments of separation tank 70. A timed interval can be selected based on empirical results, or dynamic measurements can be utilized during operation of the cleansing system. For example, a desired purity level for iron fines in main tanks 73, 74 can be selected; and, based on measurements of iron fines at 77 for the main tank 73 (which includes tank 74) with liquid withdrawal through conduit 76 in flushed purge (at 111), and in outgoing feedback (at 112) from separating tank 70, the desired purity level for the cleansing treatment tanks 73, 74 can be established and maintained. The level of iron fines measured at 112 in the feedback line is kept at or below the desired level for tank 73, measured at 77. The effectiveness of the retention in separating tank 70 is determined by a continuing comparison of measurements at 111 and 112.

Selection of a low purity level for iron fines is taught by the invention to maintain significantly improved continuous cleansing and finishing operations. The effectiveness of the present methods and apparatus enables selection of a desired low purity level for iron fines for the feedback solution from separating tank 70. For example, purity levels for feedback solution from separating tank 70 are selected significantly below one hundred ppm for iron fines; selecting a level of about fifty ppm provides a decrease in iron fines by a factor of ten to fifteen times below the five hundred ppm upper level previously considered acceptable for treatment with hot caustic cleaning solution.

For example, the separation tank 70 can be operated to return solution with a purity level of about thirty to forty ppm iron fines to decrease the iron fines to that level in main tank 73. And main tank 73 can be held to such a selected low level, or lower level, indefinitely. The effect of such low level iron fines on iron content of an in-line hot-dip galvanizing bath is a significant contribution of the invention and is discussed in more detail in relation to FIG. 8.

Clearing of one or both interior spaces (95 or 99) of tank 70 can be carried out free of interruption of in-line cleansing or finishing operations. Because of the short time interval involved in drainage of tank 70, several alternatives are provided. As mentioned, each space (95, 99) can be cleared separately or simultaneously. In the specific embodiment of FIGS. 2, 3 the returning filtrate from the mechanical filtering structure 78 can continue along conduit 80, with valves 114, 115 (FIG. 2) closed for the short time interval required for draining and flushing both sides of tank 70. The flushed purge from structure 78 can be accumulated at chamber 116, and such accumulation treated after drainage and interior clearing of separating tank 70. Or, flushed purge can be sent to a standby separating tank, or can be sent to a standby separating compartment of tank 70 which has been cleared during the short time required for clearing a remaining compartment. A "T" connection on the inlet line can send flushed purge to either compartment (95, 99) as the other is being cleared.

In general, scheduling clearing of a relatively small-capacity tank 70 can be determined by measuring the level (ppm) of iron fines in the solution from tank 70 in relation to desired low level of iron fines selected and can be maintained in the main cleansing tank as described above. Intervals of about one to two weeks for clearing are satisfactory for clearing when operating at full capacity on a hot-dip galvanizing line cleansing about two million square feet of strip surface per side per day.

In one operational embodiment, both spaces 95, 99 of tank 70 (FIG. 3) can be quickly drained within ten to fifteen minutes. The interior walls of tank 70 are washed using hose-delivered mill water pressure. External mounting of the magnets is preferred in order to provide smooth inner surfaces to facilitated clearing of magnetically-attracted ferromagnetic contaminants. Brushes or brooms can be used to expedite clearing of magnetically-attracted material. Separating tank 70 can be drained and the contaminants washed from its interior walls and bottom panels, with the entire procedure for a five-hundred gallon tank taking from about twenty to about thirty minutes.

The caustic cleaning solution can be gradually replenished as separation tank 70 fills after such a periodic drainage clearing. A selected level for the caustic detergent is maintained in the main tank throughout the cleansing operation.

Processes for draining or otherwise clearing retained iron fines and associated debris from tank 70 can be undertaken periodically, or semi-continuously, to maintain desired separation and retention efficiency within tank 70 so as to maintain substantial uniformity of the desired purity level as selected for iron fines in the solution for the continuous operation of main tank 73, as previously described.

Figure 7:
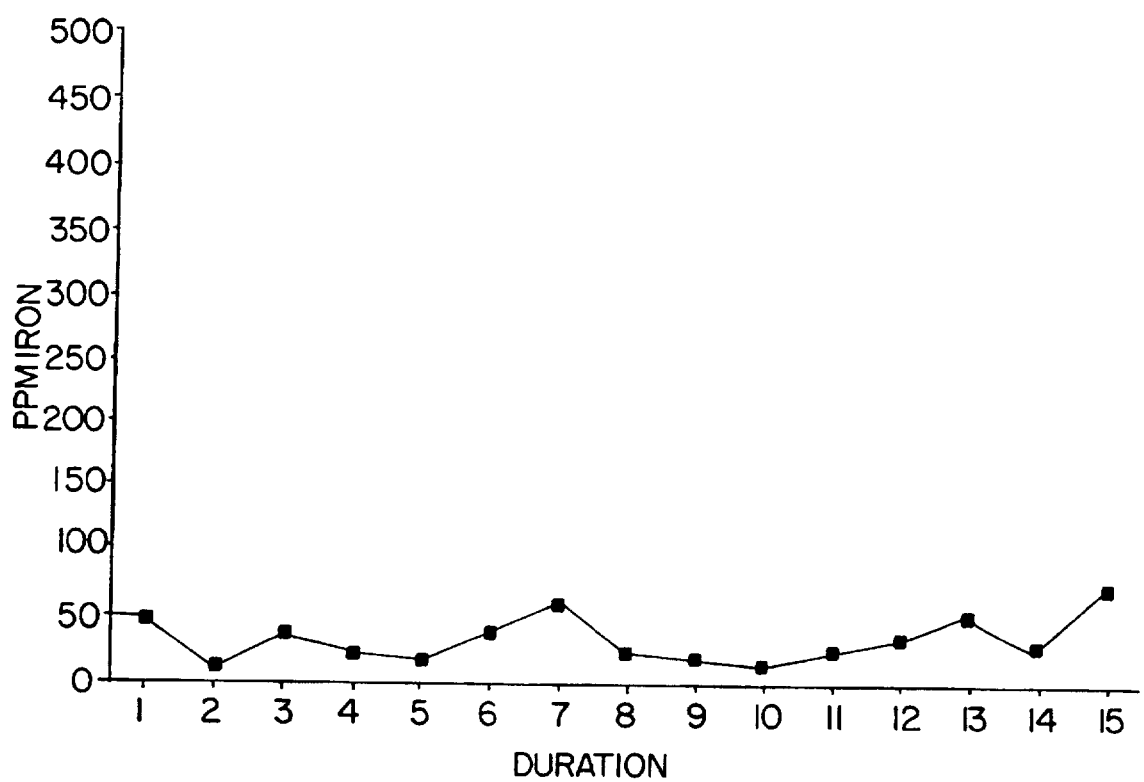
FIG. 7 is a graphical presentation for describing operational results of the invention in removing iron fines.

FIG. 7 graphically shows actual measurement of the purity level of iron fines of main tank 73 during operations in which iron fines have been kept below an average level of about fifty ppm. An extended experimental period at that selected level is now exceeding six months. Practice of the present invention indicates that interruption of finishing line operations, due to strip cleansing operations, will not be required in the foreseeable future.

For purposes of measuring iron fines in ppm, five-thousand gallons of cleaning solution are equal to slightly more than six hundred thousand ounces of solution. The present invention, using six hundred gauss magnets, can maintain a uniformly low level of iron fines of less than about thirty ounces in such a tank. Such a level constitutes a purity level of less than about fifty ppm in such tank.

The level of iron fines, as indicated in FIG. 7, has been maintained using magnetizing force magnets of about six hundred gauss, supplied by Eriez Magnetics of Erie, Pa. under the designation "Extra Power 600." Added strength magnets extending to about fifteen hundred gauss, and of increased length equal to the width of the separation tank (as schematically indicated in FIG. 6), are being installed for experimental operation and gathering of additional data; such magnets (from the same supplier) are supplied under the designation "Super Power 1500."

The following tabulated data refer to continuous cleansing solution operations for a continuous strip galvanizing line as described above:

TABLE I

| | |
|---|---|
| Main Tank 73 | 5,000 gals. |
| Withdrawn From Tank 73 | About 2,700 gal./hr |
| Centrifugal Filter Apparatus 78 | Lakos In-Line Separator |
| Filtrate from 78 | About 2,300 gal./hr. |
| Separation Tank 70 | 500 gals. |
| Length of Tank 70 | 8 feet |
| Width of Tank 70 | 4 feet |
| Height of Tank 70 | 4.25 feet |
| Flushed Purge to Tank 70 | About 400 gal./hr. |
| Magnet Field Strength | 600 gauss per magnet |
| Number of Magnets Per Row | 4 |
| Total Magnets on Entrance Side Endwall | 12 |
| Total Magnets on Exit Side Endwall | 8 |
| Continuous Galvanizing Line Throughput | 2 million square feet of surface area per side per day |

A suitable continuously-operable centrifugal separator comprises a Lakos In-line Separator manufactured by Lakos Separators USA, 1911 North Helm Avenue, Fresno, Calif. 93727; interval flushing, or continuous flushing of mechanically-filtered purged material is available. Caustic detergent materials can be obtained from suppliers such as Elf Atochem North America, Inc., 2375 State Road, Cornwall Heights, Pa. 19020.

Figure 2:
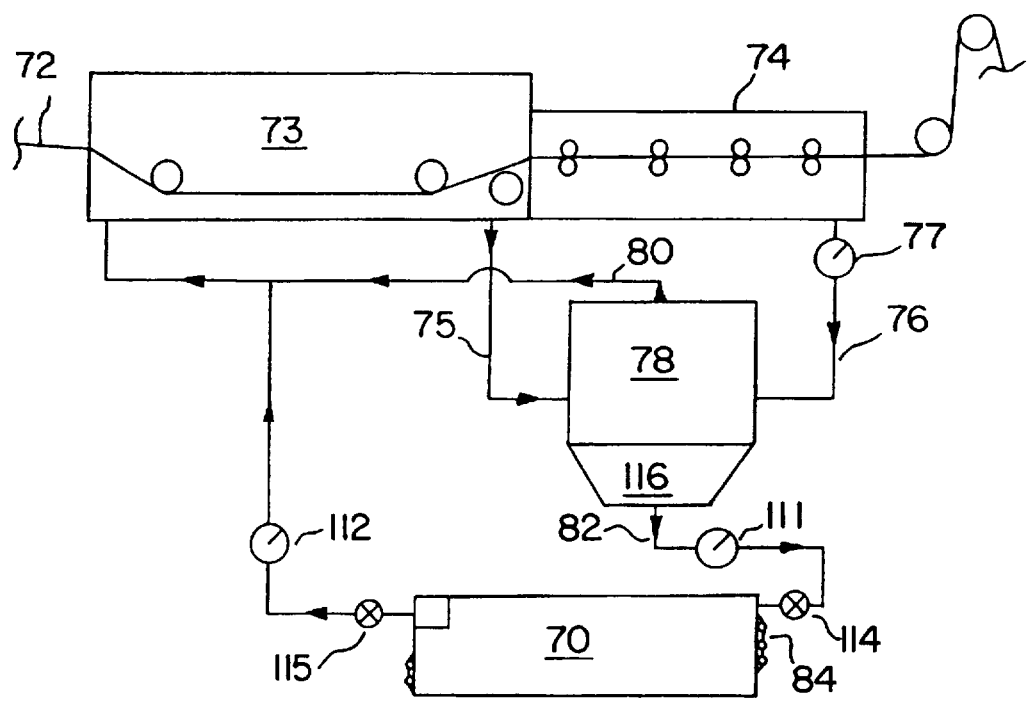
FIG. 2 is a schematic general arrangement for describing a specific continuous flat-rolled steel strip cleansing embodiment of the invention.
Figure 8:
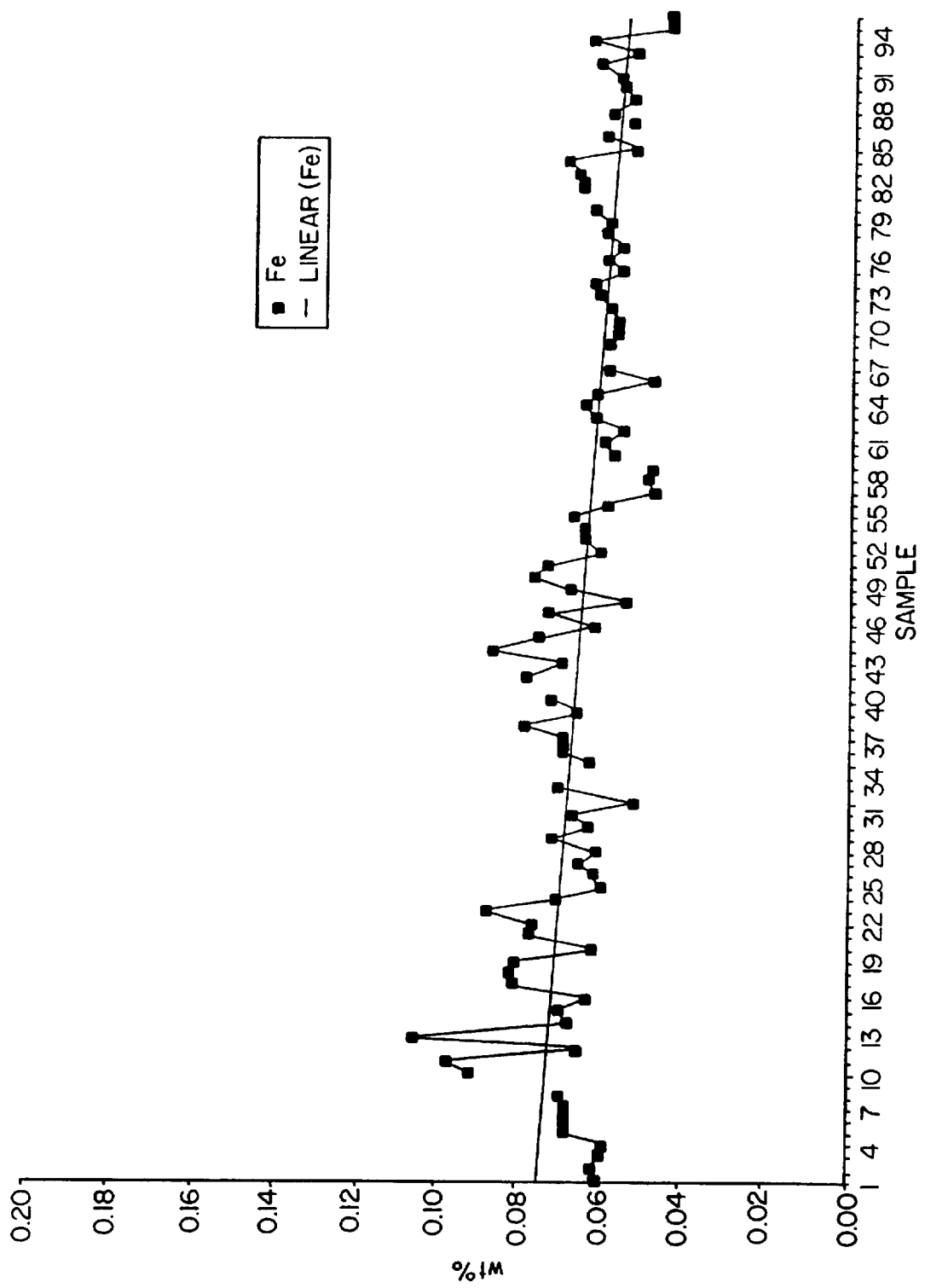
FIG. 8 is a graphical presentation for describing operational results of the invention in decreasing iron content of a hot-dip galvanizing bath.

FIG. 8 shows how the iron content of an in-line hot-dip galvanizing bath has been decreased (from about 0.072% to about 0.057%) based on daily measurements over a period of about three months (94 days) during which iron fines in a main cleaning tank, such as 73 FIG. 2, was maintained at a level as indicated in FIG. 7. Iron content of such galvanizing bath is continuing to decrease, due to the low level of iron fines being introduced into the bath due to strip cleansing operations in accordance with the present invention. As a result of decreasing iron content in the galvanizing bath, the aluminum efficiency increases and iron-aluminum dross decreases.

The iron content of the galvanizing bath is expected to continue to decrease along the solid line indicated in FIG. 8 to a significantly lower level. As iron content decreases, aluminum additions to the bath can be decreased and more standardized, based on the throughput of steel. However, increased aluminum additions will be required when galvanize coating is alloyed with the steel substrate. Such product, in which lightweight galvanized coating is totally alloyed with the substrate steel by increasing the temperature of the steel strip, requires added aluminum.

While specific dimensions, materials and data have been set forth in describing a specific embodiment of the invention, it should be recognized that in light of the teachings presented, others skilled in the art can devise operations which differ from those specifically described without departing from the inventive concepts described; therefore, in determining the scope of the present invention reference shall be had to the appended claims.

We claim:

1. Method for providing a continuously-operable solution cleansing system for use in cleansing iron fines and associated surface debris from flat-rolled steel strip for subsequent processing, comprising
   A. providing a continuous-strip line with in-line main cleaning solution tank means of predetermined capacity for receiving flat-rolled steel in continuous strip form for surface cleansing;
   B. providing for continuously-operable surface cleansing of such steel strip, by:
      (i) selecting such predetermined capacity so as to enable continuous withdrawal of a preselected portion of such solution as contaminated by surface cleansing of iron fines and associated debris,
      (ii) continuously withdrawing such preselected portion of such predetermined capacity, as contaminated;
      (iii) directing such withdrawn contaminated portion to contaminant separation means for separating and retaining such iron fines and associated debris, with such contaminant separation means presenting:
         (a) a separating tank assembled from non-ferromagnetic material of predetermined thickness gauge between closely-spaced opposite surfaces so as to present a plurality of internal surfaces disposed within the separating tank with the remaining opposite surface presenting an external surface of the separating tank,
         (b) an inlet means for receiving such withdrawn contaminated portion for movement selected from the group consisting of along at least one such internal surface and along more than one internal surface of the separating tank,
         (c) magnetic field source means disposed so as to establish lines of magnetic flux selected from the group consisting of a location contiguous to at least one internal surface and locations contiguous to more than one such internal surface within the separating tank, so as to magnetically attract and retain iron fines and associated debris surface contaminants internally of such separating tank, and
         (d) means for returning cleaning solution, from which such contaminants have been separated and retained, to such main tank means; and
   C. maintaining desired uniformity of strip-cleansing operations in such main tank means, free of interruption of operations of such continuous-strip line for replacement of cleaning solution for strip surface cleansing purposes, by
   D. continuously magnetically removing such surface contaminants from contaminated solution being withdrawn from such main tank means, magnetically retaining such contaminants, as removed, and returning cleaning solution from which contaminants have been removed to such main tank means.

2. The method of claim 1, further including monitoring iron fine content of cleaning solution in such main tank, monitoring iron fine content of cleaning solution being returned from such means for magnetically removing and retaining such surface contaminants, continuously operating such in-line solution cleansing of such steel strip, and continuously magnetically removing and separating such surface contaminants so as to provide substantially uniform clean solution in such main tank means so as to enable substantially uniform surface cleansing of such steel strip during continuous operations of such strip processing line.

3. The method of claim 1, including continuously withdrawing contaminated solution from such main tank means, directing such contaminated solution to continuously-operable mechanical filtering means, returning filtrate after such mechanical filtering means to such main tank means, continuously flushing mechanically filtered iron fines and associated debris surface contaminants from such mechanical filtering means, directing such flushed contaminants to such separating tank for continuously removing and separating such surface contaminants from such contaminated cleaning solution, such separating tank utilizing non-ferromagnetic material to present (a) an inlet means presenting an extended surface area for distribution of such flushed contaminants, (b) magnetic field source means disposed externally in relation to such separating tank so as to attract and remove such iron fines and associated debris surface contaminants so as to remain internally of such separating tank, and (c) means for returning cleaning solution, from which such surface contaminants have been removed and separated, to such in-line main cleaning solution tank means.

4. The method of claim 3, further including finishing coating operations for such continuous-strip located in-line subsequent to such strip surface cleansing;

monitoring iron fine content of cleaning solution removed from such main tank means, monitoring any iron fine content of cleaning solution being returned from such separating tank, and continuously operating such strip surface cleansing and such removal of surface contaminants so as to substantially eliminate surface contaminants being carried by such steel strip into subsequent in-line strip finishing operations.

5. The method of claim 4, in which such strip finishing operations are selected from the group consisting of:
 (i) hot-dip metal coating,
 (ii) metallic electrolytic plating,
 (iii) surface passivating with inorganic material,
 (iv) polymer coating, and
 (v) combinations thereof.

* * * * *